(12) United States Patent
Maus et al.

(10) Patent No.: US 8,528,884 B2
(45) Date of Patent: Sep. 10, 2013

(54) INJECTION NOZZLE FOR SUPPLYING REDUCING AGENT AND DEVICE FOR TREATING EXHAUST GASES

(75) Inventors: Wolfgang Maus, Bergisch Gladbach (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/355,717

(22) Filed: Jan. 23, 2012

(65) Prior Publication Data

US 2012/0156105 A1 Jun. 21, 2012

Related U.S. Application Data

(63) Continuation of application No. PCT/EP2010/058807, filed on Jun. 22, 2010.

(30) Foreign Application Priority Data

Jul. 22, 2009 (DE) .......................... 10 2009 034 072

(51) Int. Cl.
*B01F 3/04* (2006.01)

(52) U.S. Cl.
USPC ....................... 261/118; 261/DIG. 9; 239/556

(58) Field of Classification Search
USPC ............. 261/115, 117, 118, DIG. 9, DIG. 39; 239/556, 558, 559, 560, 561
See application file for complete search history.

(56) References Cited

U.S. PATENT DOCUMENTS

| | | | |
|---|---|---|---|
| 1,485,495 A * | 3/1924 | Eldred et al. .................. 239/561 |
| 3,895,449 A * | 7/1975 | Chance et al. .................. 34/638 |
| 3,943,639 A * | 3/1976 | Vits ................................ 34/638 |
| 3,991,942 A * | 11/1976 | Peitl .............................. 239/566 |
| 4,247,047 A * | 1/1981 | Schaming ..................... 239/391 |
| 5,058,549 A | 10/1991 | Hashimoto et al. |
| 5,934,571 A | 8/1999 | Schmidt et al. |
| 6,062,056 A * | 5/2000 | Groch ............................. 72/201 |
| 6,161,780 A * | 12/2000 | Sugimoto et al. ........ 239/533.12 |
| 6,382,600 B1 | 5/2002 | Mahr |
| 6,622,693 B2 | 9/2003 | Arndt et al. |
| 6,622,944 B1 * | 9/2003 | Hurley et al. ................. 239/426 |

(Continued)

FOREIGN PATENT DOCUMENTS

| CN | 101048580 A | 10/2007 |
|---|---|---|
| DE | 2348372 A1 | 5/1974 |

(Continued)

OTHER PUBLICATIONS

International Search Report of PCT/EP2010/058807, Dated Oct. 21, 2010.

*Primary Examiner* — Charles Bushey
(74) *Attorney, Agent, or Firm* — Laurence A. Greenberg; Werner H. Stemer; Ralph E. Locher

(57) ABSTRACT

An injection nozzle for supplying reducing agent to an exhaust gas system includes a plurality of outlet openings, each of which can generate different droplets of the reducing agent. A device for the treatment of exhaust gases includes an exhaust gas treatment unit and at least one corresponding injection nozzle, in which at least two groups of outlet openings form different impingement regions on the exhaust gas treatment unit.

10 Claims, 3 Drawing Sheets

(56) References Cited

U.S. PATENT DOCUMENTS

| | | |
|---|---|---|
| 6,851,623 B1 * | 2/2005 | Watterworth .................... 239/10 |
| RE40,886 E | 9/2009 | Sugimoto et al. |
| 7,703,277 B2 | 4/2010 | Ueda et al. |
| 7,849,676 B2 | 12/2010 | Witte-Merl |
| 2005/0001072 A1 * | 1/2005 | Bolus et al. .................... 239/548 |
| 2006/0219821 A1 * | 10/2006 | Okuma ......................... 239/556 |
| 2007/0193255 A1 | 8/2007 | Satou |
| 2008/0041036 A1 * | 2/2008 | Witte-Merl ..................... 60/282 |

FOREIGN PATENT DOCUMENTS

| | | |
|---|---|---|
| DE | 2636659 A1 | 2/1978 |
| DE | 4230056 A1 | 3/1994 |
| DE | 198 27 220 A1 | 1/1999 |
| DE | 10032336 A1 | 1/2002 |
| DE | 10122350 A1 | 11/2002 |
| DE | 10158674 A1 | 6/2003 |
| DE | 102006038904 A1 | 2/2008 |
| EP | 0586913 A2 | 3/1994 |
| EP | 0809017 A1 | 11/1997 |
| GB | 1442341 A | 7/1976 |
| JP | 2002531743 A | 9/2002 |
| WO | 02/090762 A1 | 11/2002 |
| WO | 2006/083026 A1 | 8/2006 |
| WO | 2009/055315 A2 | 4/2009 |

\* cited by examiner

INJECTION NOZZLE FOR SUPPLYING REDUCING AGENT AND DEVICE FOR TREATING EXHAUST GASES

CROSS-REFERENCE TO RELATED APPLICATION

This is a continuation, under 35 U.S.C. §120, of copending International Application No. PCT/EP2010/058807, filed Jun. 22, 2010, which designated the United States; this application also claims the priority, under 35 U.S.C. §119, of German Patent Application DE 10 2009 034 072.6, filed Jul. 22, 2009; the prior applications are herewith incorporated by reference in their entirety.

BACKGROUND OF THE INVENTION

Field of the Invention

The present invention relates to an injection nozzle for supplying reducing agent to an exhaust gas system, and further relates to a device for the treatment of exhaust gases, having an exhaust gas treatment unit and at least one injection nozzle. Systems of that kind are used especially to add aqueous ammonia solution to an exhaust gas system in a controlled manner, in particular in order to reduce the nitrogen oxide content of the exhaust gas.

One method for converting nitrogen oxides, in particular, in the exhaust gas using an aqueous urea solution and a suitable catalyst is known as the "SCR method" (Selective Catalytic Reaction), for example.

Generally speaking, the ammonia required for the SCR reaction is not used directly, i.e. in the pure form, but in the form of a 32.5% aqueous urea solution, which can also be obtained under the name AdBlue®. That aqueous solution is injected into the exhaust section ahead of the SCR catalytic converter, e.g. through the use of a metering pump or injector.

In that process, the aqueous urea solution is converted into ammonia and is passed over an SCR catalyst together with the exhaust gas. Conversion of the aqueous urea solution into ammonia can be accomplished through the use of thermolysis and/or hydrolysis. Whereas the aqueous urea solution is heated during thermolysis, resulting in corresponding decomposition of the aqueous urea solution, the aim with hydrolysis is a catalytically activated reaction of urea to give ammonia. In thermolysis, external heating elements that are in contact with the aqueous urea solution may be provided. However, it is also possible to achieve the desired temperatures by finely divided injection of the aqueous urea solution into the hot exhaust gas. In hydrolysis, an appropriate hydrolysis catalyst has to be provided, in which case the aqueous urea solution is brought into contact with the aqueous urea solution together with the exhaust gas or, alternatively, outside the exhaust gas system. In the present case, a portion of aqueous urea solution is fed into the exhaust gas system carrying the exhaust gas, with the result that the conversion to ammonia takes place in the presence of exhaust gas.

The reactions which take place during this process can be represented as follows:

Hydrolysis of the Urea Solution:

Pyrolysis: $(NH_2)_2CO \rightarrow NH_3 + HNCO$ (isocyanic acid)

Hydrolysis: $HNCO + H_2O \rightarrow NH_3 + CO_2$

Ammonia and $CO_2$, in particular, are formed from the aqueous urea solution. The ammonia produced in this way can react with the nitrogen oxides in the exhaust gas at an appropriate temperature in a special SCR catalytic converter. There are substantially two types of SCR catalysts. One type is formed substantially of titanium dioxide, vanadium pentoxide and tungsten oxide. The other type uses zeolites.

Reduction of Nitrogen Oxides:

$4NH_3 + 4NO + O_2 \rightarrow 4N_2 + 6H_2O$ ("Standard SCR");

$2NH_3 + NO + NO_2 \rightarrow 2N_2 + 3H_2O$ ("Fast SCR");

$4NH_3 + 3NO_2 \rightarrow 3.5N_2 + 6H_2O$ ("$NO_2$ SCR").

The quantity of urea injected is controlled as a function of the nitrogen oxide emissions of the internal combustion engine and hence of the instantaneous speed and torque of the engine. Depending on the raw emissions from a diesel engine, the consumption of aqueous urea solution is about 2 to 8% of the diesel fuel being used. If the metered quantity is too small, the efficiency with which the nitrogen oxide level is reduced falls. If too much urea is metered in, the ammonia thereby formed cannot react with NOx and can enter the environment. Since ammonia has a pungent smell and can be perceived even at very small concentrations, that would lead to an unpleasant smell in the vicinity of the vehicle in the case of over-metering. A remedy can be provided by fitting an oxidation catalytic converter behind the SCR catalytic converter.

Many variants have already been discussed with regard to the location of injection of the reducing agent. Thus, the aqueous urea solution can be added upstream of a mixing element, downstream of a mixing element, in the region of a swirl chamber, upstream of the SCR catalytic converter, downstream of an exhaust gas treatment unit, etc., for example. In each case, the point of interest therein is to achieve as uniform or rapid mixing of the reducing agent as possible in the stream of exhaust gas, thus ensuring that the reactants are available in sufficient quantities as they flow through the catalytic converter. In that context, there have already been several discussions of the problem that, on one hand, vaporization has to take place as quickly and completely as possible and, on the other hand, there has to be uniform distribution in the stream of exhaust gas while allowing for the respectively prevailing conditions in the exhaust gas. The temperature of the exhaust gas, the flow behavior of the exhaust gas and the composition of the exhaust gas play an important role in this case.

For many different exhaust gas systems, it has not been possible heretofore to achieve this in a fully satisfactory manner for a large number of different exhaust gas systems, in particular with a low level of technical complexity. In that context, the ability to retrofit existing exhaust gas systems in motor vehicle construction, in particular, is especially difficult.

SUMMARY OF THE INVENTION

It is accordingly an object of the invention to provide an injection nozzle for supplying reducing agent and a device for treating exhaust gases, which overcome the hereinafore-mentioned disadvantages and at least partially solve the highlighted problems of the heretofore-known nozzles and devices of this general type. In particular, the intention is to specify an injection nozzle which has a simple construction and allows a supply of reducing agent that is variable or matched to flow conditions in the exhaust gas system. It is furthermore the intention to specify a particularly preferred configuration of the injection nozzle in the exhaust gas system for as complete a conversion of the reducing agent or vaporization of the reducing agent as possible.

With the foregoing and other objects in view there is provided, in accordance with the invention, an injection nozzle for supplying reducing agent to an exhaust gas system. The injection nozzle comprises a plurality of outlet openings each configured to generate and supply different respective droplets of the reducing agent.

The injection nozzle normally has a connection region, through which the injection nozzle can be connected to a reducing-agent supply system. For this purpose, the injection nozzle generally has a holding region, with which the injection nozzle can be fixed on an exhaust pipe of the exhaust gas system, for example. This holding region can have additional insulating devices in order to allow thermal decoupling of the injection nozzle from the hot exhaust gas system. The injection nozzle furthermore has an area of addition, which is generally disposed within the exhaust gas system. In this area of addition, a plurality of outlet openings is also provided, through which the reducing agent can be injected into the exhaust pipe, at a pressure of from 3 to 30 bar, for example.

In the case of the injection nozzle proposed herein, outlet openings through which different droplets of the reducing agent can be generated in each case are provided. In other words, this means, in particular, that droplets of different sizes emerge simultaneously for a predetermined time period, for example, from the injection nozzle at a predetermined pressure of the reducing agent and when the injection nozzle is activated. In this case, at least two different types of droplet or sizes of droplet are generated. In principle, it is also possible for a multiplicity of different droplets to be formed simultaneously through the use of the outlet openings. Supplying different droplets with the same injection nozzle allows a specifically intended droplet flight path, taking into account the exhaust gas parameters. If, for example, an impingement region for the respective droplets of the reducing agent is specified, the types of droplet can be selected such that they are injected in such a way (e.g. according to length or angle relative to the stream of exhaust gas) that they reach the impingement region (along different flight paths) in a precisely targeted manner. Appropriate alignment of the injection nozzle or of the different outlet openings allows particularly simple mounting with a wide range of possible variation and high targeting accuracy.

In accordance with another especially preferred feature of the invention in this context, outlet openings of different cross sections are provided. If, for example, consideration is given to the case where the outlet opening is a kind of bore, the different outlet openings can thus be embodied with different bore cross sections. However, it is also possible to provide at least some of the outlet openings with a cross section that tapers or widens in the direction of flow of the reducing agent. Combinations of these types of cross section are, of course, also possible. In addition, it is also possible, for example, for the direction of the outlet openings or direction of flow of the reducing agent through the cross sections to be varied.

In accordance with a further feature of the invention, in order to obtain an injection nozzle of particularly simple construction, it is furthermore proposed that the outlet openings be formed through the use of a spray disk. In this case, the main body of the injection nozzle can be retained for a large number of uses, for example, and an appropriate spray disk can be provided for the particular application. Moreover, the spray disk can be rotated relative to the injection nozzle, if appropriate, allowing the position of the outlet openings with respect to the injection nozzle or to the exhaust gas system to be modified. The spray disk does not have to be of flat construction. It is also possible in this case to employ spray disks which are curved, if appropriate. It is likewise possible to place a plurality of spray disks directly one behind the other in order to form outlet openings of a particular cross section by rotating the two spray disks relative to each other or to enable different droplets of the reducing agent to be generated even during the operation of the injection nozzle or of the exhaust gas system.

In accordance with an added feature of the invention, at least two groups of outlet openings on the injection nozzle are separated. In other words, this also means that it is possible to identify zones in which just one type of outlet opening is provided in each case. In this context, therefore, "separated" is intended, in particular, to mean that at least two groups are spatially delimited from each other or spaced apart. In special cases, it is also possible for further groups to be provided, in particular in such a way that identical outlet openings are disposed in several groups. In this way, it is possible, in particular, to ensure that the direction of injection or the respectively generated injection jets are separated from each other and do not have any significant disadvantageous effect on each other during operation.

In accordance with an additional feature of the invention, it is furthermore also proposed that all of the outlet openings be connected by a single feed duct. The feed duct has a cylindrical and/or annular construction and generally extends along the central axis of the injection nozzle as far as the outlet openings. The feed duct or channel is thus also connected to the reducing agent supply system. From this, it is thus possible to see that the same feed pressure is present at all of the outlet openings as is present in the common single feed duct. The feed duct can be opened and closed as required through the use of a pin, a flap or the like, for example, thereby controlling the supply of reducing agent to the outlet openings. This also provides a particularly simple construction for the injection nozzle.

With the objects of the invention in view, there is also provided a device for the treatment of exhaust gases. The device comprises an exhaust gas treatment unit and at least one injection nozzle according to the invention. The at least two groups of outlet openings form different impingement regions on the exhaust gas treatment unit.

Normally, an injection nozzle of this kind is then inserted obliquely into the exhaust line, with the result that the central axis thereof also points obliquely at one end face of the exhaust gas treatment unit, for example.

In principle, it is possible in this case for an injection nozzle of this kind to be positioned upstream and/or downstream of the exhaust gas treatment unit. If a position upstream of the exhaust gas treatment unit is provided, addition is in the direction of flow of the exhaust gas. In the contrary case, i.e. when the reducing agent is to be applied to the rear end face of the exhaust gas treatment unit, addition is counter to the direction of flow.

In order to achieve wetting of the exhaust gas treatment unit with the reducing agent in as uniform a manner as possible, it is necessary to allow for the fanning out of the jet, in particular as a function of the distance of the injection nozzle from the end face of the exhaust gas treatment unit, taking into account the flow behavior of the exhaust gas. In this case, the injection nozzle according to the invention now offers the possibility of providing a group of specially embodied outlet openings for each of various impingement regions on the exhaust gas treatment unit or free flight paths of the droplets. The specific embodiment of the outlet opening can take into account, in particular, the flow behavior of the exhaust gas or the flight behavior of the reducing agent in the stream of exhaust gas.

The droplet size, spraying direction and the like can therefore be matched to both groups of outlet openings.

The wetting of the exhaust gas treatment unit in a uniform manner (with respect to time) ensures that the thermal mass of the exhaust gas treatment unit in the region of the end face is utilized in a uniform manner, resulting in corresponding uniform and rapid vaporization of the reducing agent. In addition, this avoids a situation where particularly intensive wetting of a partial area of the exhaust gas treatment unit results in cooling of the exhaust gas treatment unit, something which can have a negative effect especially on the catalytic activity of the exhaust gas treatment unit. Moreover, such exhaust gas treatment units can also form a kind of storage coating, which forms a certain buffer for the supply of gaseous reducing agent. In this case too, the intention is that the utilization of the exhaust gas treatment unit should be as uniform as possible.

In the case where the reducing agent is applied upstream of an exhaust gas treatment unit, the exhaust gas treatment unit can be a particle filter and/or hydrolysis catalytic converter, for example. This also preferably applies to the downstream supply of reducing agent, wherein (if appropriate only) the respective impingement region can be embodied with a catalyst or, alternatively, without a catalyst.

In accordance with another feature of the device of the invention, it is furthermore preferred that the at least one injection nozzle can apply large first droplets to a more distant first impingement region and small second droplets to a closer second impingement region on the exhaust gas treatment unit. In this case, therefore, two groups of different outlet openings are accordingly formed, wherein the first group generates large first droplets. These large first droplets must pass through the stream of exhaust gas over a relatively long distance. The aim in this case, therefore, is to ensure that the effect of the flow of exhaust gas is minimized by the supply of large droplets. In the case of the closer impingement regions, small second droplets are generated, and these may be fanned out by the flow of exhaust gas, thus enabling them to reach even partial areas of the end face of the exhaust gas treatment unit which are close to the edge.

In accordance with a further feature of the invention, it has been found to be especially advantageous if the at least one injection nozzle is disposed downstream of the exhaust gas treatment unit in the direction of flow of the exhaust gas and is directed toward a rearward end face of the exhaust gas treatment unit. In this case, therefore, the addition of the reducing agent will take place counter to the direction of flow, and therefore the spray jet of the injection nozzle is also especially affected in this case. Precisely in this case, specific flight behaviors of the reducing agent in the stream of exhaust gas can be obtained through the different constructions of the outlet openings, thus ensuring wetting of the rearward end face of the exhaust gas treatment unit in a specifically intended manner which is uniform overall.

In accordance with a concomitant, particularly advantageous, feature of the device of the invention, a guide is provided for the at least one injection nozzle. In particular, the guide represents a measure for the directional installation of the injection nozzle in the exhaust gas system, wherein adjusting devices and the like, for example, also allow adjustment—if appropriate later adjustment—of the injection nozzle.

The invention can be used especially in a motor vehicle having an internal combustion engine and a downstream exhaust gas system in which, in the direction of flow, an exhaust gas treatment unit is first of all provided, then at least one injection nozzle and subsequently an SCR catalytic converter. The at least one injection nozzle is connected to a pump and a tank for reducing agent, for example, by a reducing agent line. In this case, a return line from the injection nozzle or the reducing agent line to the tank can likewise be provided, wherein appropriate valves must be provided. The control of the injection nozzle can involve the action of a control unit, which is incorporated into the management system for the internal combustion engine, for example. The exhaust gas system can furthermore have sensors, further exhaust gas treatment units and the like in order to allow appropriate controlled addition of reducing agent, in particular aqueous urea solution.

Other features which are considered as characteristic for the invention are set forth in the appended claims, noting that the features presented individually in the claims can be combined in any technically meaningful way and form further embodiments of the invention.

Although the invention is illustrated and described herein as embodied in an injection nozzle for supplying reducing agent and a device for treating exhaust gases, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
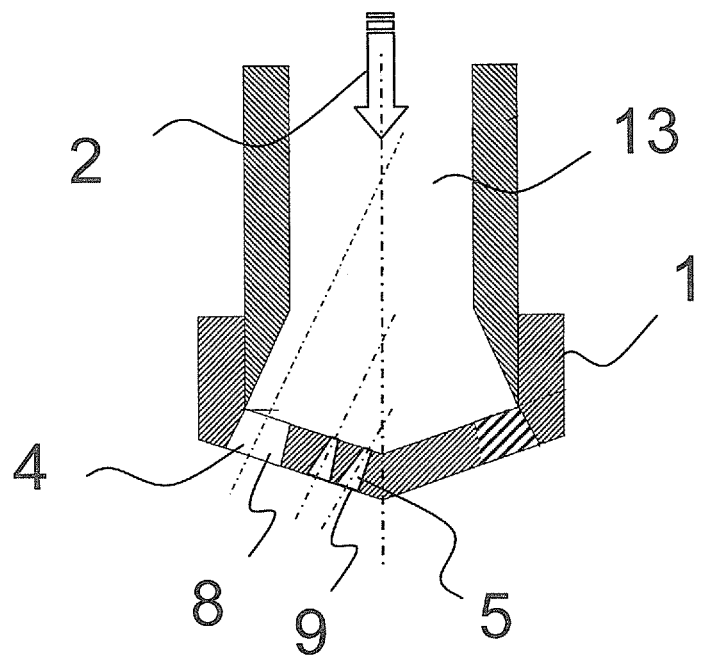
FIG. 1 is a diagrammatic, longitudinal-sectional view of a first variant embodiment of an injection nozzle according to the invention.

Referring now to the figures of the drawings in detail and first, particularly, to FIG. 1 thereof, there is seen a diagrammatic, longitudinal-sectional view of an injection nozzle 1, in which a reducing agent 2 is fed toward a tip of the injection nozzle 1 in a direction of flow, indicated by an arrow, through a single central feed duct 13. First outlet openings 4 and second outlet openings 5 are provided at the tip. The first outlet openings 4 have a first cross section 8, which is embodied differently from a second cross section 9 of the second outlet openings 5. In the present case, the first cross section 8 is made significantly larger. The first outlet openings 4 and the second outlet openings 5 also differ with regard to a spraying direction (indicated by a dash-dotted line). During the supply of the reducing agent 2 at a predetermined pressure in the feed duct 13, the reducing agent 2 simultaneously flows through both the first outlet openings 4 and the second outlet openings 5, and different droplets are generated in each case. These droplets differ, in particular, with regard to the flight path in the stream of exhaust gas.

Figure 2:
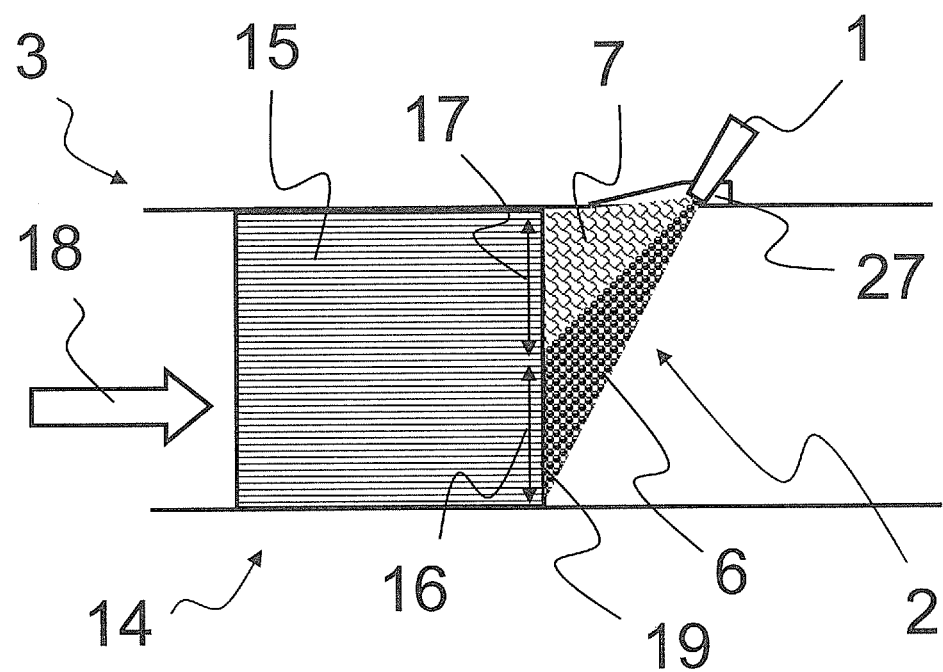
FIG. 2 is a fragmentary, reduced, longitudinal-sectional view of a configuration of the injection nozzle in an exhaust gas system.

FIG. 2 shows a preferred configuration of an injection nozzle 1 of this kind in a device 14 for the treatment of exhaust gases. In this case, an exhaust gas system 3 is configured in such a way that the exhaust gas initially flows through an exhaust gas treatment unit 15 in a direction of flow 18. The exhaust gas treatment unit 15 can (preferably) be embodied in the manner of a honeycomb body and be embodied at least in part as a particle filter and/or a hydrolysis catalytic converter. Thus, it is also possible, in particular, for (only) a rearward end face 19 of the exhaust gas treatment unit 15 to form a storage material and/or a catalyst material for the reducing agent 2.

In this case, the (single) injection nozzle 1 is directed toward the rearward end face 19 of the exhaust gas treatment unit 15 in a guide 27 at an oblique angle. Due to the configuration of the injection nozzle with a plurality of outlet openings, through the use of which different droplets of the reducing agent 2 can be generated in each case, different subjets or partial jets can be formed. In the illustration, a first subjet resulting from the first outlet openings 4 forms large first droplets 6, which impinge on a first impingement region 16, in which case the first droplets 6 must fly over a relatively long distance through the flow of exhaust gas to reach the opposing side of the rearward end face 19. In order to ensure that there is only a small effect on this flight path by the flow of exhaust gas, relatively large droplets are preferably used in this case. Closer areas, illustrated herein as a second impingement region 17 on the rearward end face 19 of the exhaust gas treatment unit 15, can be reached to the same effect with smaller second droplets 7, which are generated through the use of the second outlet openings 5 of the injection nozzle 1. In this way, it is, in particular, also possible to ensure that the jet of droplets fans out, and it is thus also possible to wet the regions close to the edge, with another alternative being to use a large angle. In order to generate as precise a spray pattern as possible in this case during the operation of the internal combustion engine in different load states, the injection nozzle 1 is preferably disposed in such a way that the droplets are still positioned in the outflow region of the exhaust gas from the exhaust gas treatment unit 15. This means, in particular, that, after flowing through the exhaust gas treatment unit 15, the exhaust gas still has a substantially laminar flow. This region extends, in particular, over a width of at most 60 mm or, if appropriate, as little as 40 mm. This construction of the injection nozzle ensures that uniform wetting of the various impingement regions on the rearward end face 19 of the exhaust gas treatment unit 15 occurs due to the number, direction and/or cross section of the outlet openings.

Figure 3:
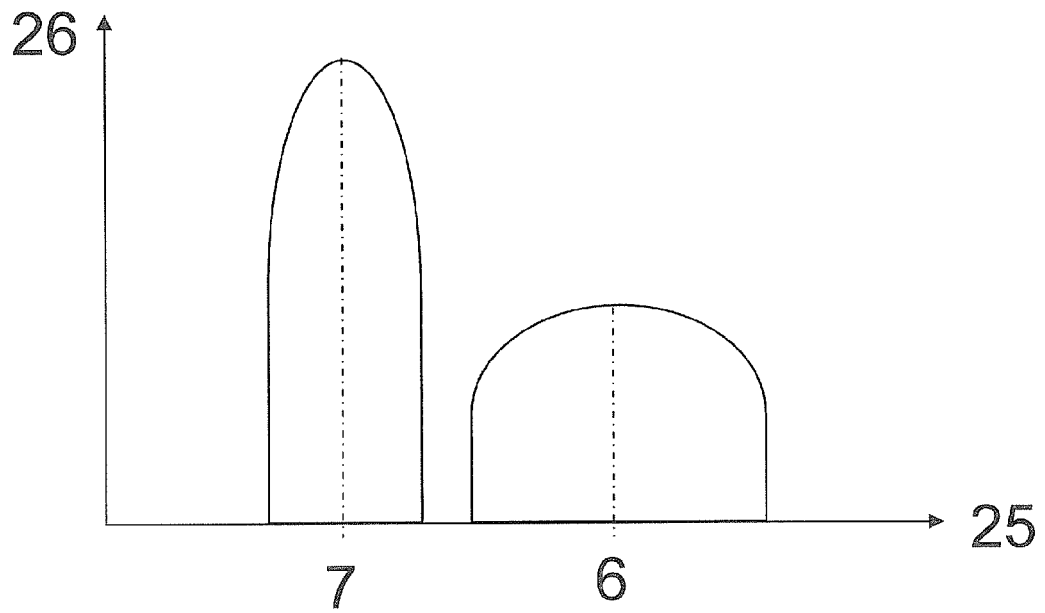
FIG. 3 is a diagram illustrating a droplet distribution with an injection nozzle of this kind.

FIG. 3 is a diagram intended to illustrate the spray pattern of an injection nozzle of this kind. In the diagram, a generated number 26 of droplets is plotted against a size 25 of the droplets. It can be seen on the left that on average second droplets 7 of a predetermined second size are generated in a relatively large number 26. In addition and at the same time, however, (the same) quantity of first droplets 6 with a larger size 25, although in a smaller number 26, is also supplied. It is, of course, also possible for additional droplet sizes to be achieved with the injection nozzle and, if appropriate, it also allows a (partial) superimposition of the respective droplet sizes. However, a clear differentiation between the droplet sizes is preferred.

Figure 4:
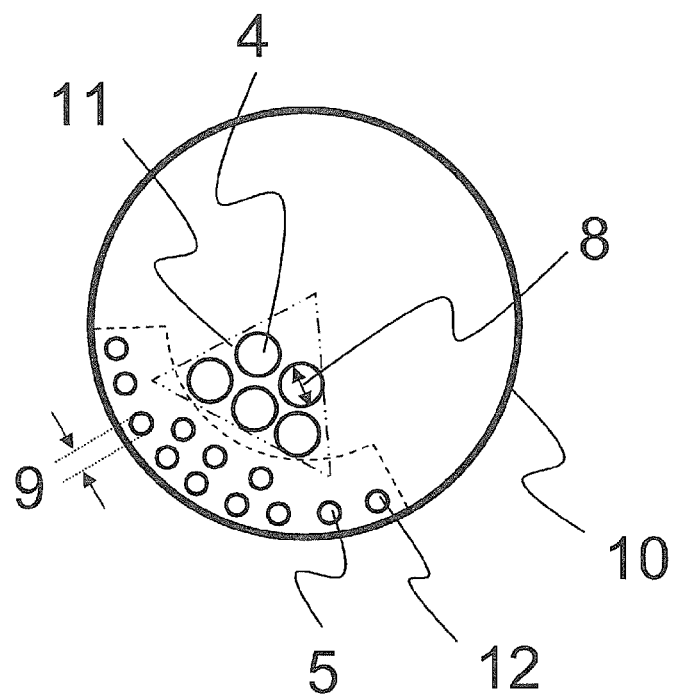
FIG. 4 is a plan view of a spray disk with various outlet openings.

A spray disk 10 of the kind illustrated in FIG. 4 can be used, for example, in order to obtain such different droplets. The circular spray disk 10, which is in the form of a plate in this case, does not have outlet openings over the full area thereof but, instead, first and second separate groups 11, 12 including different outlet openings are formed in this case. Thus, the second group 12 including the second outlet openings 5 is formed in a zone in the form of a segment of an arc close to the edge of the spray disk 10, for example. In this case, each of the multiplicity of second outlet openings 5 has an identical construction and, in particular, has the same second cross section 9. Further into the central area of the spray disk 10, the first group 11 including the first outlet openings 4 is formed to the same effect. In this case, the number of outlet openings is made significantly fewer and the first outlet openings 4 have a significantly larger first cross section 8. In particular, the asymmetric configuration of the groups of outlet openings takes the oblique installation of the injection nozzle into account and, therefore, is not absolutely necessary.

Figure 5:
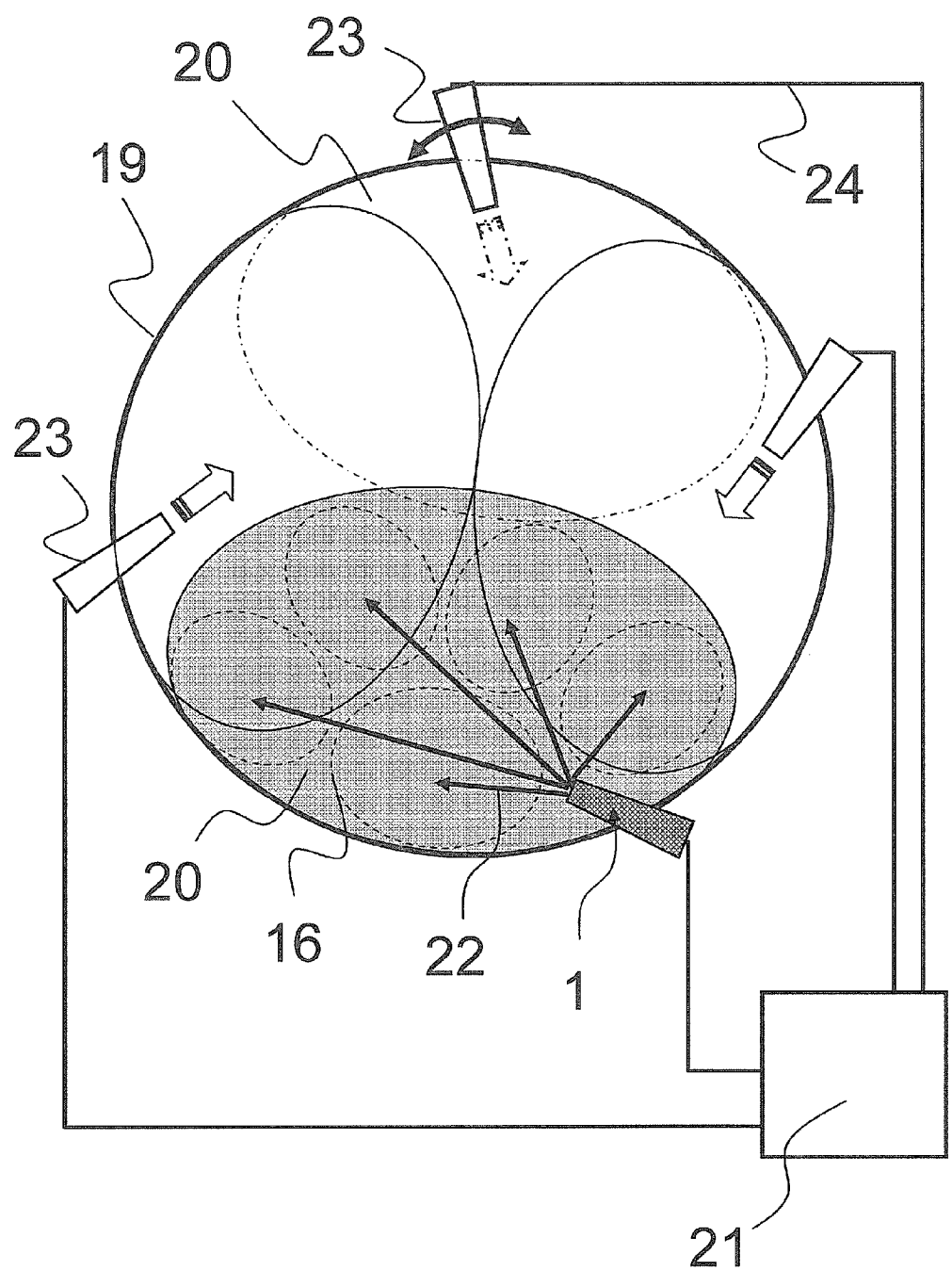
FIG. 5 is a rear-elevational view of an exhaust gas treatment unit having a plurality of injection nozzles.

FIG. 5 shows a diagrammatic, rear-elevational view of an exhaust gas treatment unit. The unit is wetted by a plurality of injection nozzles, in this case four. Therefore, in this case, it is not possible for the rearward end face 19 to be wetted uniformly by a single nozzle 23. On the contrary, four nozzles are required in this case. Provision can also be made for at least one of the nozzles 23 to be disposed in such a way that it can be moved, i.e. pivoted, in order to enlarge an area of addition or introduction 20 (which is a maximum area that can be reached in each case on the rearward end face 19). All of the nozzles 23 or injection nozzles 1 are connected over lines 24 to a control unit 21 which, in particular, specifies opening times for the nozzles. A specific area of addition 20 is indicated at the bottom. In this case, the injection nozzle 1 has a multiplicity of different outlet openings and they therefore differ especially with regard to a direction of addition or introduction 22 and the droplet size. One area of addition is defined for each group of outlet openings, and the droplet size and/or direction of addition 22 is matched to the flow conditions.

With the injection nozzle proposed herein, uniform wetting of rearward end faces of exhaust gas treatment units is achieved in a particularly simple and effective manner, especially when it comes to appropriate retrofitting of existing exhaust gas systems.

The invention claimed is:

1. An injection nozzle for supplying aqueous urea solution as reducing agent to an exhaust gas system, the injection nozzle comprising:

a plurality of outlet openings each configured to generate and supply to the exhaust gas system different respective droplets of different droplet sizes of the aqueous urea solution reducing agent, said outlet openings having differently widening or tapering cross sections in a direction of flow of the reducing agent.

2. A device for the treatment of exhaust gases, the device comprising:

an exhaust gas treatment unit; and at least one injection nozzle for supplying aqueous urea solution as reducing agent to the exhaust gas treatment unit, said at least one injection nozzle including:

a plurality of outlet openings each configured for generating and supplying the exhaust gas treatment unit with different respective droplets of different droplet sizes of the aqueous urea solution reducing agent, said outlet openings having different cross sections, and said outlet openings being separated into at least two groups on said at least one injection nozzle;

said at least two groups of outlet openings forming different impingement regions on said exhaust gas treatment unit, said at least one injection nozzle being configured for carrying out a wetting of an end face or a front face the exhaust gas treatment unit with reducing agent in an overall uniform manner.

3. The device according to claim 2, wherein said impingement regions include a first impingement region being more distant from said at least one injection nozzle and a second impingement region being closer to said at least one injection nozzle, and said at least one injection nozzle is configured to apply relatively large first droplets to said first impingement region and relatively small second droplets to said second impingement region on said exhaust gas treatment unit.

4. The device according to claim 2, wherein said at least one injection nozzle is disposed downstream of said exhaust gas treatment unit in a direction of flow of the exhaust gas and is directed toward said end face of said exhaust gas treatment unit.

5. The device according to claim 2, which further comprises a guide for said at least one injection nozzle.

6. The device according to claim 2, wherein said outlet openings have differently widening or tapering cross sections in a direction of flow of the reducing agent.

7. The device according to claim 2, wherein said injection nozzle and said exhaust gas treatment unit are constructed to maintain laminar flow conditions in an outflow region.

8. The device according to claim 7, wherein said injection nozzle is disposed at a distance of at most 60 mm behind said exhaust gas treatment unit.

9. The device according to claim 2, which further comprises a spray disk in which said outlet openings are formed.

10. The device according to claim 2, which further comprises a single feed duct interconnecting all of said outlet openings.

* * * * *